United States Patent [19]
Hirukawa

[11] Patent Number: 6,006,643
[45] Date of Patent: Dec. 28, 1999

[54] STRETCHING JIG FOR BRAIDING MANDREL AND METHOD FOR FORMING LONG MOLDING

[75] Inventor: Masao Hirukawa, Uji, Japan

[73] Assignee: Murata Kikai Kabushiki Kaisha, Kyoto, Japan

[21] Appl. No.: 09/140,282

[22] Filed: Aug. 26, 1998

[30] Foreign Application Priority Data

Sep. 11, 1997 [JP] Japan .................................. 9-268029

[51] Int. Cl.[6] ............................. D04C 3/48; B32B 31/00
[52] U.S. Cl. .................................. 87/34; 87/35; 156/161; 156/393; 264/231
[58] Field of Search .................................. 87/34, 35, 23, 87/13, 1, 62; 156/161, 229, 393, 494, 149; 264/231, 291, 297.6, 297.8; 425/111; 72/302

[56] References Cited

U.S. PATENT DOCUMENTS

| | | | |
|---|---|---|---|
| 2,602,766 | 7/1952 | Francis | 154/91 |
| 2,794,481 | 6/1957 | Anderson | 154/1.8 |
| 3,156,598 | 11/1964 | Martin | 156/161 |
| 3,231,442 | 1/1966 | Michael | 156/155 |
| 3,433,696 | 3/1969 | Michael | 156/425 |
| 3,442,738 | 5/1969 | Scott et al. | 156/161 |
| 3,769,836 | 11/1973 | Heldenbrand | 72/302 |
| 4,155,791 | 5/1979 | Higuchi | 156/161 |
| 4,803,878 | 2/1989 | Moroney | 72/296 |
| 4,976,812 | 12/1990 | McConnell et al. | 156/148 |
| 5,145,157 | 9/1992 | Polk | 269/266 |
| 5,320,696 | 6/1994 | McConnell et al. | 87/35 |
| 5,327,765 | 7/1994 | Weykamp et al. | 72/296 |
| 5,429,693 | 7/1995 | Rose | 156/161 |
| 5,468,327 | 11/1995 | Pawlowicz et al. | 87/34 |
| 5,554,240 | 9/1996 | Toy | 156/83 |
| 5,700,337 | 12/1997 | Jacobs et al. | 156/64 |

FOREIGN PATENT DOCUMENTS 772609 4/1957 United Kingdom ....................... 87/34

Primary Examiner—Gloria M. Hale
Assistant Examiner—Tejash Patel
Attorney, Agent, or Firm—Armstrong, Westerman, Hattori, McLeland and Naughton

[57] ABSTRACT

To prevent a long molding from bending during drying and hardening in a drying furnace after braiding. A pair of rotatable joints 2 and 3 are used as a stretching jig for a long braiding mandrel, the joints are connected to the respective ends of the mandrel, and a loading means 16 is used to stretch the mandrel via the joints to apply tension to it.

4 Claims, 5 Drawing Sheets

STRETCHING JIG FOR BRAIDING MANDREL AND METHOD FOR FORMING LONG MOLDING

FIELD OF THE INVENTION

The present invention relates to a stretching jig for a braiding mandrel utilized to mold a long molding using a braider and to a method for forming a long molding using this mandrel.

BACKGROUND OF THE INVENTION

When a braider is utilized to form a long molding, a long braiding mandrel is generally used. This mandrel is braided with yarns such as resin or glass fiber, and wrapped with a thermal-contracting tape. The mandrel is then placed in a drying furnace, where the braided molding is heated, dried and hardened.

In this case, the long molding may bent during hardening. Therefore, it is an object of this invention to prevent the long molding from bending during drying and hardening in a drying furnace after braiding.

SUMMARY OF THE INVENTION

According to this invention, a pair of rotatable joints are used as a stretching jig for a long braiding mandrel, the joints are connected to the respective ends of the mandrel, and a loading means is used to stretch the mandrel via the joints to apply tension to it. The joints are preferably ball joints. The loading means is preferably connected to one of the joints and is screwed into a bracket of a frame.

DETAILED DESCRIPTION OF THE PREFERRED EMBODIMENTS

An embodiment of this invention is described below.

Figure 1:
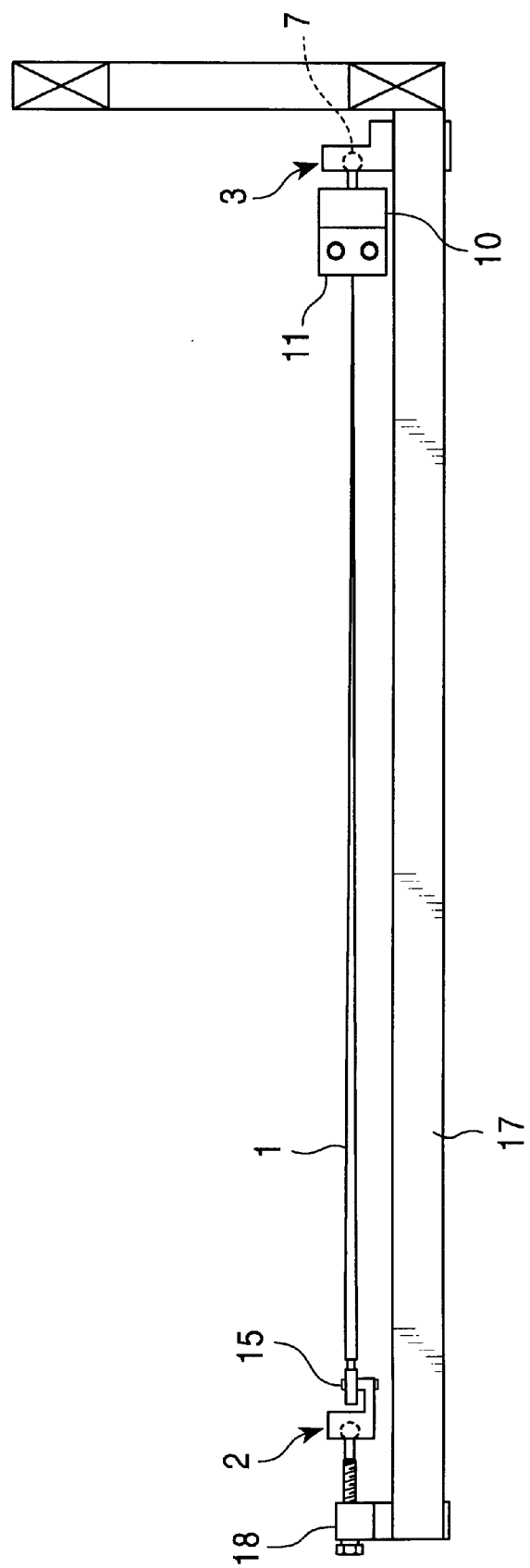
FIG. 1 is a side view showing an embodiment of the present invention.
Figure 2:
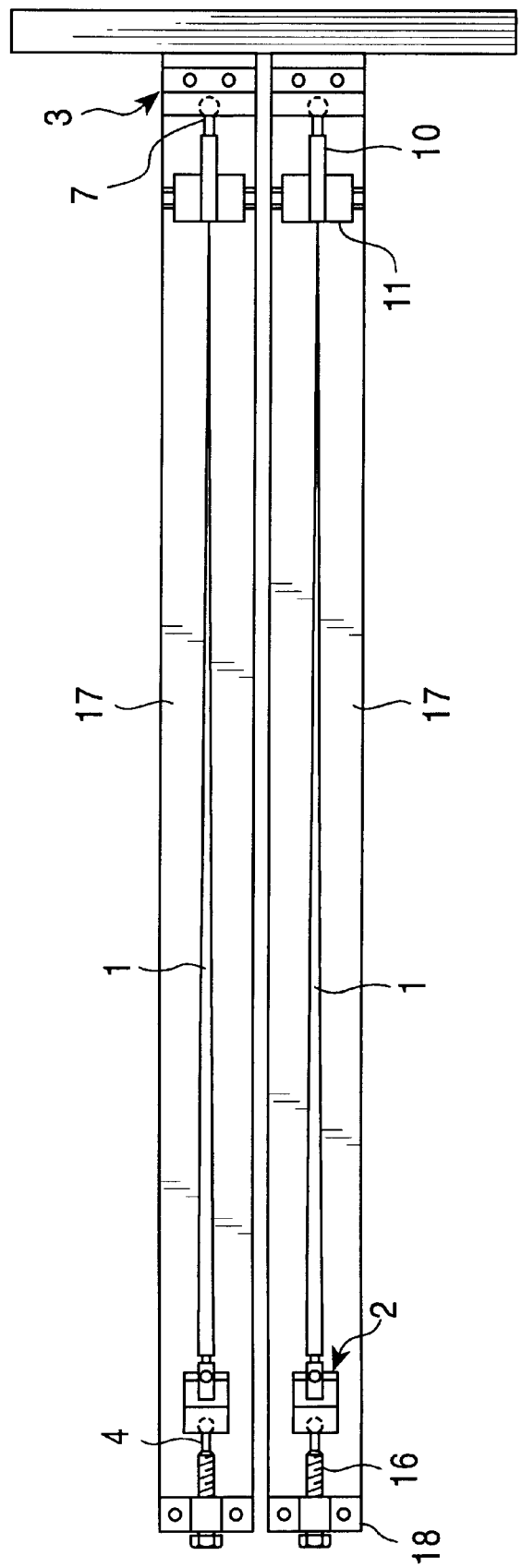
FIG. 2 is a top view of the stretching jig in FIG. 1.
Figure 3:
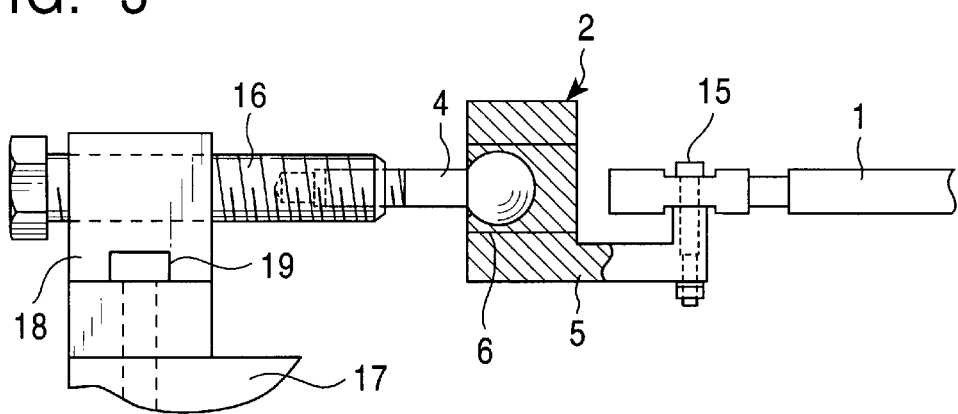
FIG. 3 is a side view including a partial section of one of the joints in FIG. 1.
Figure 4:
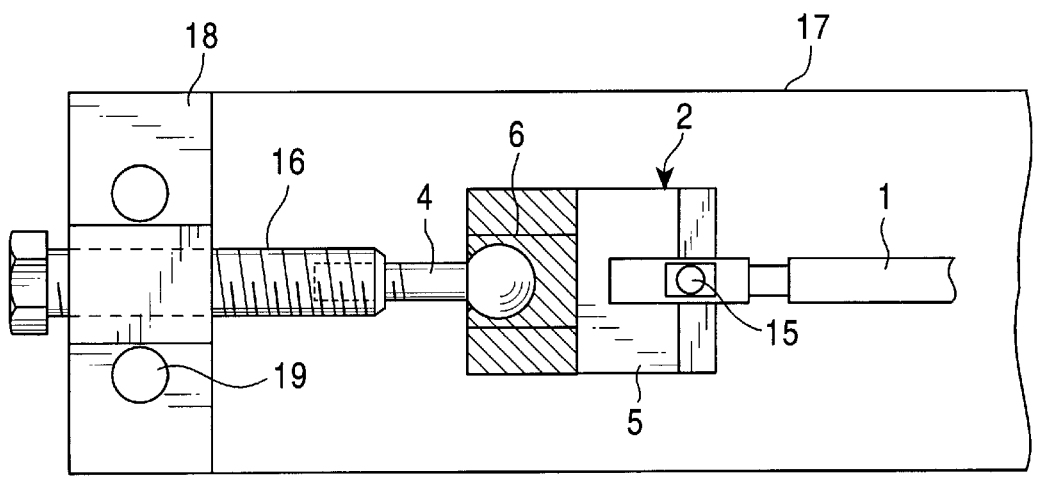
FIG. 4 is a top view including a partial section of the joint in FIG. 3.
Figure 6:
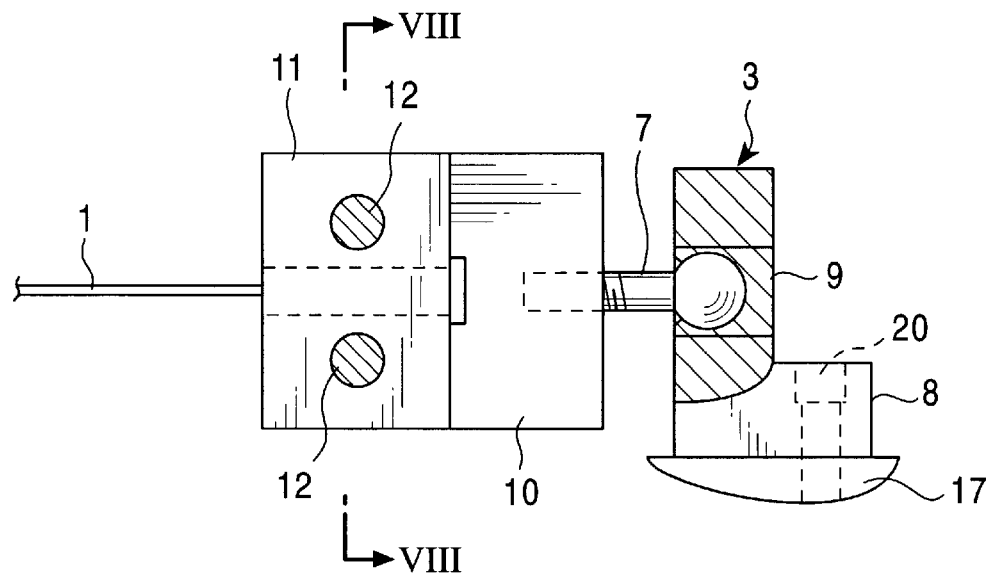
FIG. 6 is a side view including a partial section of the other joint in FIG. 1.
Figure 7:
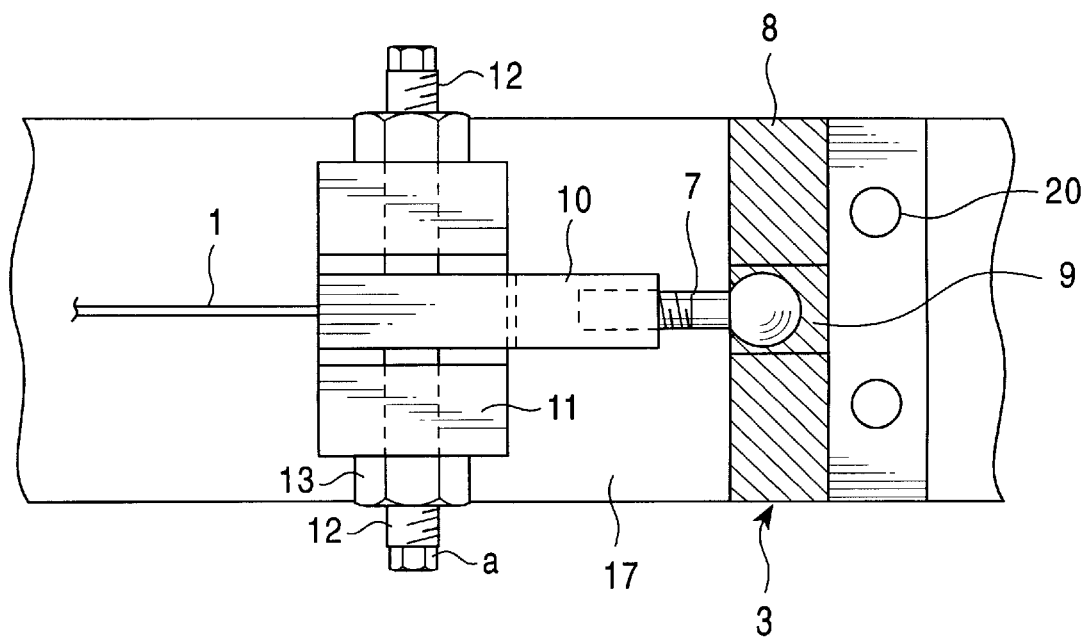
FIG. 7 is a top view including a partial section of the joint in FIG. 6.

FIGS. 1 and 2 show a stretching jig that is used for a long braiding mandrel 1 and has a pair of rotatable joints 2 and 3. As shown in FIGS. 3 and 4, one of the joints 2 is a ball joint comprising a link ball 4 and a block 5. The link ball 4 is spherically fitted in a socket 6 of the block 5 to enable the link ball 4 and the block 5 to be moved relative to each other. As shown in FIGS. 6 and 7, the other joint 3 is a ball joint comprising a link ball 7 and a bracket 8. The link ball 7 is spherically fitted in a socket 9 of the bracket 8 to enable the link ball 7 and the bracket 8 to be moved relative to each other.

Figure 8:
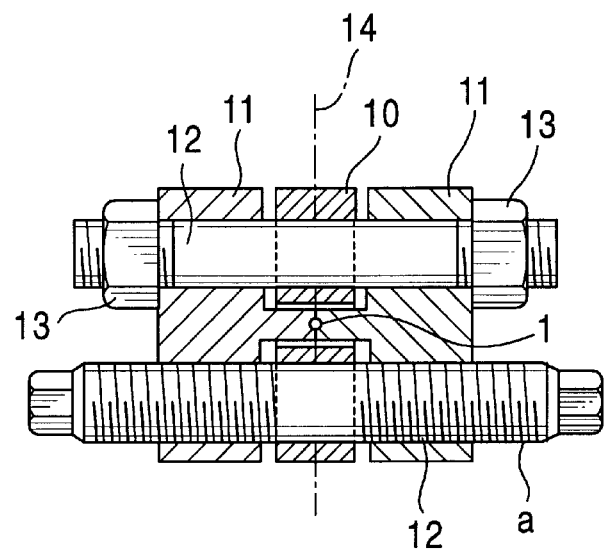
FIG. 8 is a sectional view taken along the line VIII—VIII in FIG. 6.

Furthermore, the link ball 7 of the joint 3 is screwed into a forked platelike member 10 and inserted into a groove in the block 11 as shown in FIG. 8. A connecting bolt 12 penetrates the block 11 and the member 10, and a nut 13 is screwed onto the connecting bolt 12 to connect the block 11 and the member 10. The block 11 is divided into two along the central vertical surface 14 of the member 10 and link ball 7. A shaft a is used to open and close the block 11.

When the braider is used to form a long molding, the mandrel 1 in FIG. 1 is braided with yarns such as resin or glass fiber. Furthermore, the mandrel 1 is wrapped with a thermal-contracting tape and the joints 2 and 3 are connected to the respective ends of the mandrel 1.

According to this embodiment, a shaft is molded by means of braiding, and the mandrel 1, which is used for this purpose, is tapered in such a way that one end is relatively thick while the other end is very thin. Furthermore, a through-hole is formed in the thick end, and a pin 15 is passed through the through-hole in the mandrel 1 and fixed to the block 5 of the joint 2. Moreover, at the other joint 3, the thin end of the mandrel 1 is inserted between the two divided blocks 11 and fixed tightly by the nuts 13 and the connecting bolts 12. Thus, one of the joints 2 is connected to the thick end of the mandrel 1, whereas the other end 3 is connected to the thin end.

Figure 5:
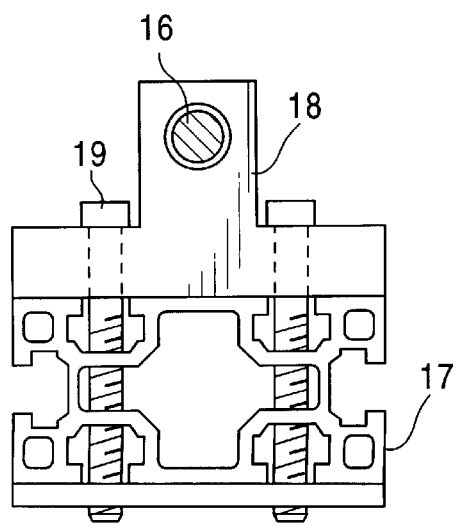
FIG. 5 is a front view including a partial section of the joint in FIG. 3.
Figure 9:
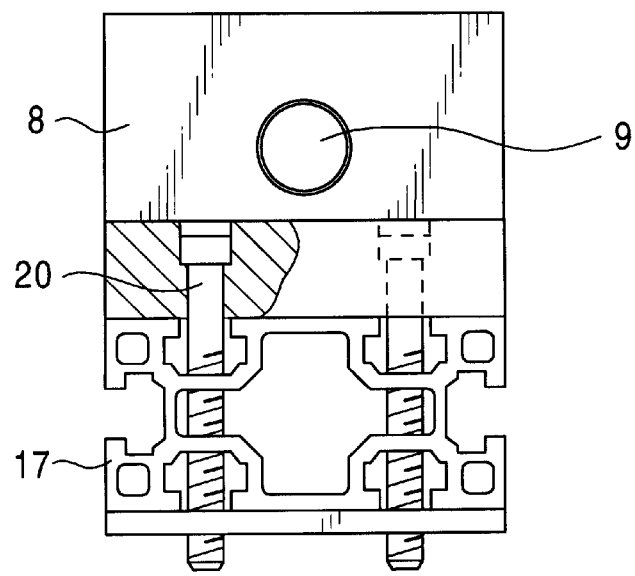
FIG. 9 is a rear view including a partial section of the joint in FIG. 6.

Subsequently, a loading means is used to apply tension to the mandrel 1 via the joints 2 and 3. The loading means comprises a stretching bolt 16 and is connected to one of the joints 2. According to this embodiment, the link ball 4 of the joint 2 is screwed into the stretching bolt 16 and fixed, and the stretching bolt 16 is screwed into a bracket 18 of a frame 17. The connecting bolt 19 fixes the bracket 18 to the frame 17, as shown in FIG. 5. A connecting bolt 20 also connects and fixes the bracket 8 of the other joint 3 to the frame 17, as in the bracket 18 of the stretching bolt 16, as shown in FIG. 9. Thus, when a tool is used to rotate the stretching bolt 16, the screwing action between the bolt 16 and the bracket 18 causes the bolt 16 to move in the axial direction to apply tension to the mandrel 1 via the joints 2 and 3.

In this stretching jig, when the stretching bolt 16 is used to apply tension to the mandrel 1, the stretching bolt 16, the link ball 4, the mandrel 1 and the link ball 7 are centrally located on the same axis. In addition, the link ball 4 and block 5 of one of the joints 2 can be rotated against each other, and the link ball 7 and bracket 8 of the other joint 3 can be rotated against each other. Thus, only a tensile load is applied to the mandrel and no bending load is applied, which means that the mandrel 1 is not bent.

Subsequently, the frame 17 is suspended in a drying furnace, and the braided molding is heated, dried and hardened. In the meantime, the mandrel 1 is subjected to a tensile force. Therefore, the molding is not bent.

As described above, when a long molding is dried and hardened in a drying furnace after braiding, this invention can prevent it from bending, thereby achieving the intended object.

I claim:

1. A stretching jig for a braiding mandrel comprising a pair of rotatable ball joints arranged to be connected to respective ends of said braiding mandrel, and a loading means for stretching said braiding mandrel via the ball joints to apply tension to said braiding mandrel, wherein said loading means is connected to one of the ball joints and comprises a stretching bolt screwed into a bracket of a frame.

2. A method for forming a long molding comprising forming said long molding on a braiding mandrel with a braider and drying and hardening said long molding in a drying furnace while applying tensile force to both ends of said braiding mandrel.

3. A braider for forming a long molding on a braiding mandrel, comprising a stretching jig for said braiding mandrel comprising a pair of rotatable ball joints arranged to be connected to respective ends of said braiding mandrel, and a loading means for stretching said braiding mandrel via the ball joints to apply tension to said braiding mandrel.

4. A braider according to claim 3, wherein said loading means is connected to one of the joints and comprises a stretching bolt screwed into a bracket of a frame.

* * * * *